UNITED STATES PATENT OFFICE.

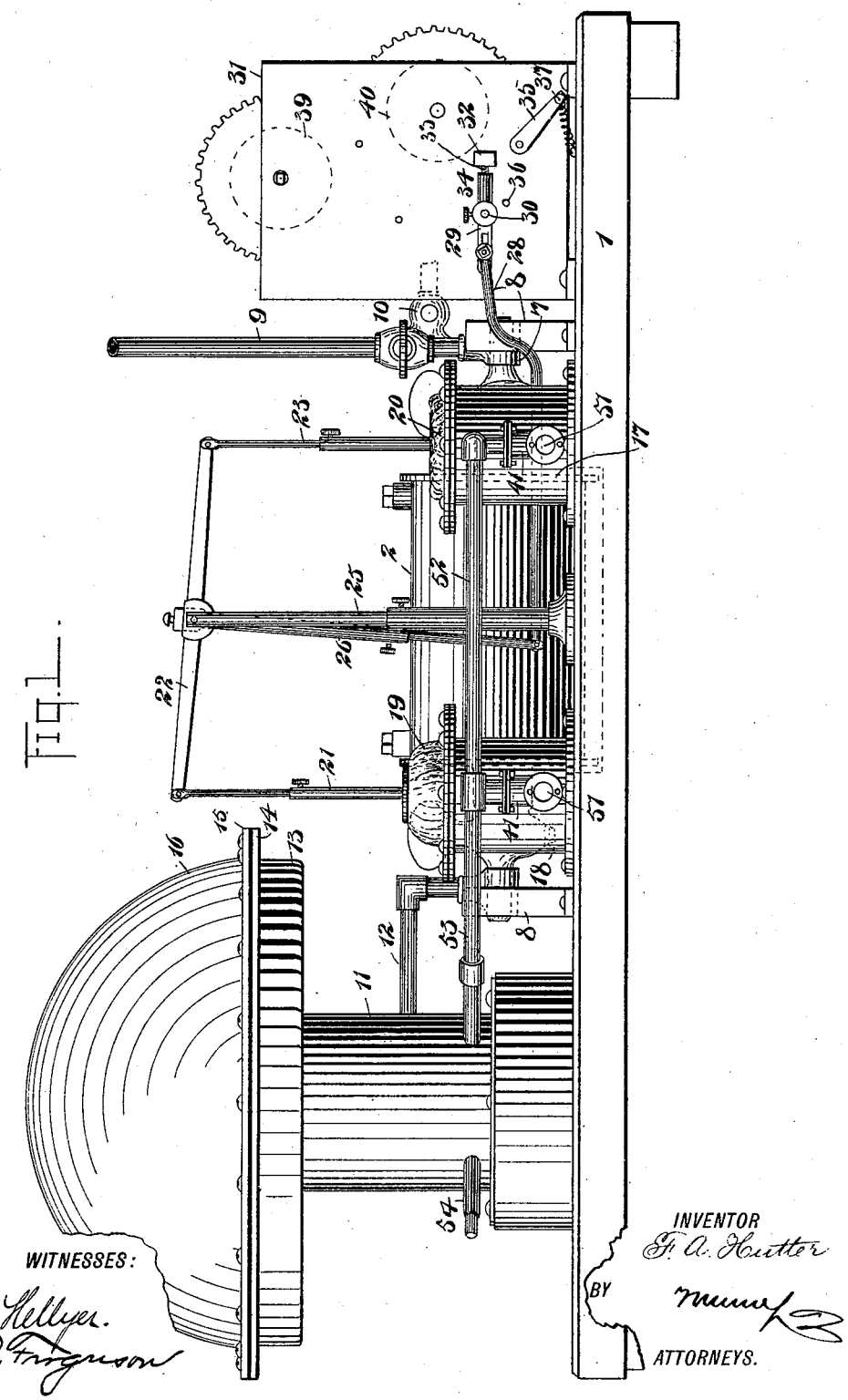

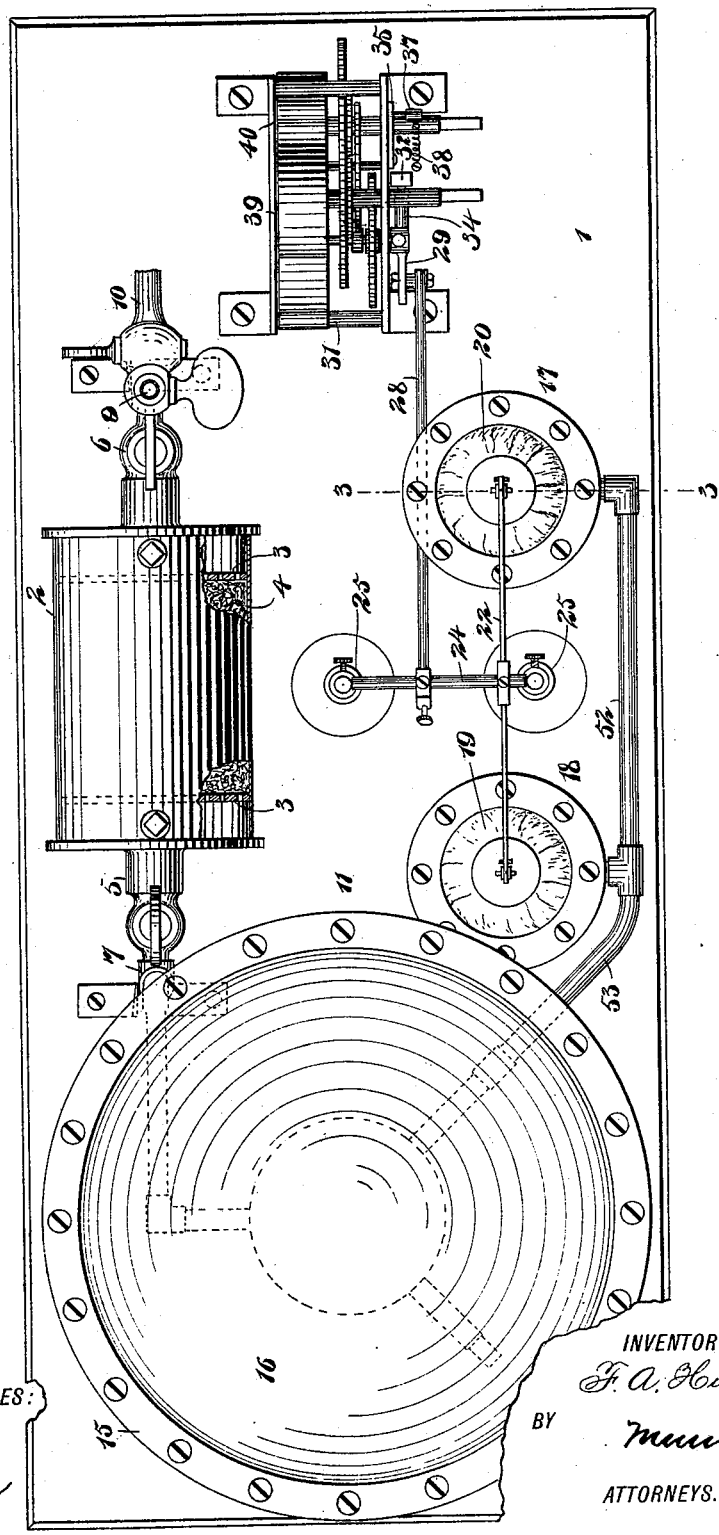

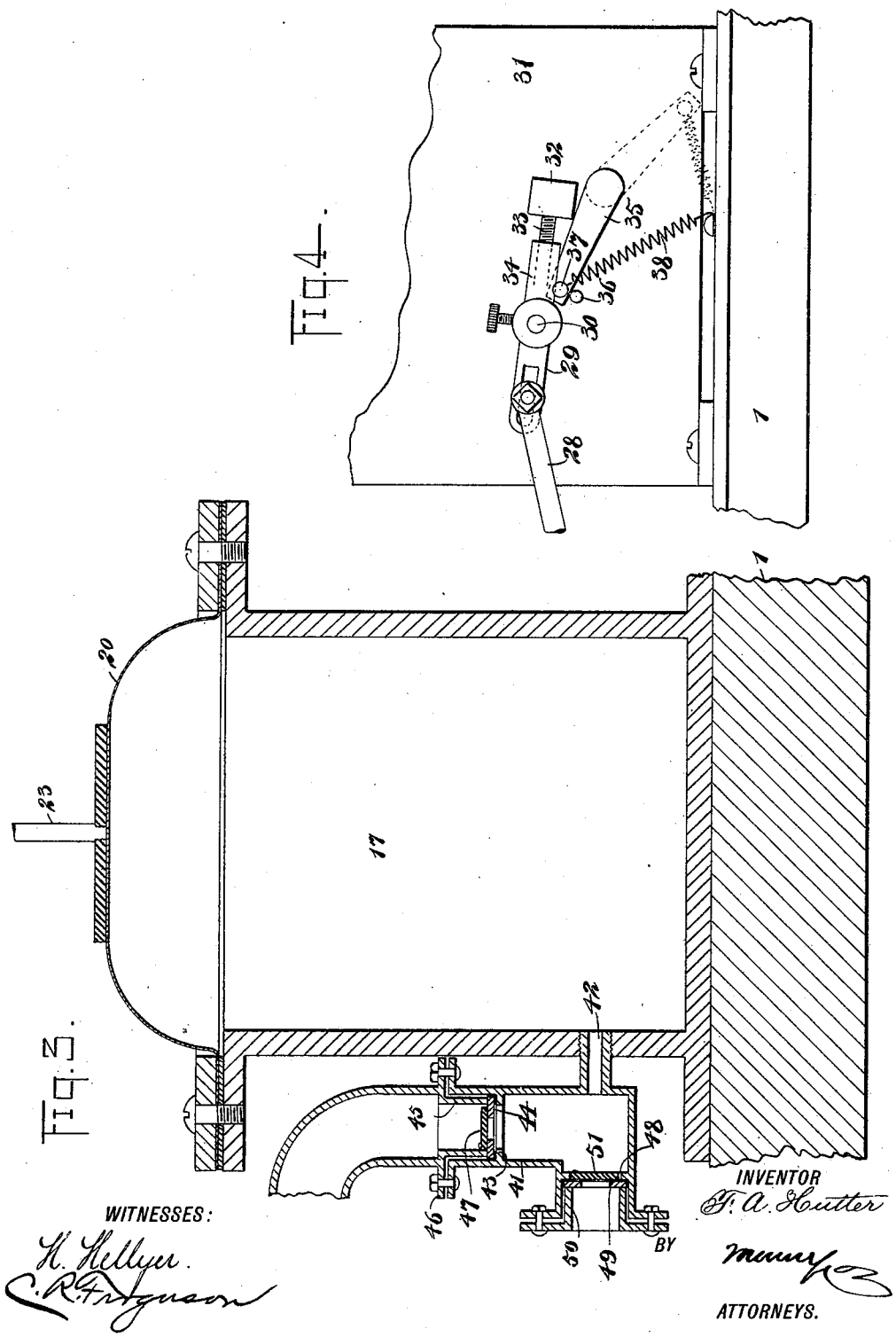

FRANK A. HUTTER, OF NEW HAVEN, CONNECTICUT, ASSIGNOR TO EMILIE HUTTER, OF SAME PLACE.

GAS-GENERATING MACHINE.

SPECIFICATION forming part of Letters Patent No. 594,742, dated November 30, 1897.

Application filed September 4, 1896. Serial No. 604,831. (No model.)

*To all whom it may concern:*

Be it known that I, FRANK A. HUTTER, of New Haven, in the county of New Haven and State of Connecticut, have invented a new and Improved Gas-Generating Machine, of which the following is a full, clear, and exact description.

This invention relates to a machine of a portable character for generating gas for illuminating or heating purposes, and the object is to provide a machine of very few parts, of light construction, and in which a maximum of power-pressure may be maintained by a minimum of pumping power.
I will describe a gas-generator embodying my invention and then point out the novel features in the appended claim.

Reference is to be had to the accompanying drawings, forming a part of this specification, in which similar characters of reference indicate corresponding parts in all the views.

Figure 1 is a side elevation of a gas-generating machine embodying my invention. Fig. 2 is a top plan view thereof. Fig. 3 is a section on the line 3 3 of Fig. 2 and drawn on an enlarged scale; and Fig. 4 is a detail view, drawn on an enlarged scale, showing a portion of a driving power employed.

Referring to the drawings, 1 designates a bed-plate of any suitable material and designed to support all the working parts of a machine. Mounted on the base 1 is a generator 2, here shown as cylindrical in form, and provided in its interior with perforated partitions 3, between which is packed an absorbent material 4—such, for instance, as sponge. This generator has a valve-controlled inlet 5 and a valve-controlled outlet 6. The tubular inlet and outlet are mounted to rotate in bearings 7, secured in suitable uprights 8, mounted on the base. The object in mounting the generator to rotate is to provide means whereby the hydrocarbon oil contained therein may be wholly consumed—
that is, after a certain time the heavier particles of the oil will settle to the bottom of the generator, and then by giving the generator a half-rotation such oil will be caused to percolate downward through the absorbent material.

The outlet 6 may communicate with any desired number of service-pipes leading to lamps or to cooking-stoves. As I have here shown, the valve-controlled pipe 9 and the valve-controlled pipe 10 lead to the said outlet. An air-pressure cylinder 11 has communication through a pipe 12 with the inlet 5 of the generator. This air-pressure cylinder has an enlarged portion 13, provided with an outwardly-extended annular flange 14, between which flange and a clamp-ring 15 is clamped the edge of an elastic cover 16. This elastic cover 16 may consist of rubber and when inflated will assume a hemispherical form, and this elastic cover will give sufficient pressure to force the air through the pipe 12 and through the generator, where said air mixes with the oil and forms the gas which flows out from the service-pipes. In order to provide an uninterrupted flow of air into said air-chamber, and consequently cause an uninterrupted current of air through the generator, I employ two pumps 17 and 18. These pumps 17 and 18 are here shown made cylindrical, and the tops of the respective pumps are formed by a flexible material 19 and 20, the edges of said flexible material being secured to the upper flanged ends of the pump-cylinder by means of a ring and screws, as plainly indicated in the drawings. These flexible tops are in effect plungers or pistons operating in connection with the pump-cylinder, and therefore I will term them "flexible" plungers. The flexible plunger 19 has a stem 21, extended upward and connected with one end of a lever 22, and the flexible plunger 20 has a similar stem 23, pivotally connecting with the opposite end of said lever 22.

The lever 22 is connected at its central portion to a rock-bar 24, having bearings at its ends in the upper portion of standards 25, extended upward from the base 1. Extended downward from the rock-bar 24 is a rod 26, to the lower end of which is pivotally connected a pitman 28, which at its opposite end has connection with a motor, as will be presently described.

In order to regulate the throw of the plungers and to increase the pumping power, I make each plunger-stem in two sections longitudinally adjustable one section relatively to the other. As here shown, one section telescopes into the other section, and set-screws are employed to hold the sections as adjusted. The uprights 25 are also made vertically adjustable, and, as here shown, consist of two telescopic sections held adjustable by set-screws, and the rod 26 also consists of two telescopic sections provided with a set-screw for holding them as adjusted. It is obvious that when the stems 21 23 are longitudinally adjusted the parts 25 and 26 must be correspondingly adjusted.

The pitman 28 has connection with a wrist-pin of a crank 29, mounted on the power-shaft 30 of a motor 31. The wrist-pin is adjustable longitudinally of the crank within a slot formed in said crank. Preferably I employ a counterbalance in connection with the crank 29. As here shown, the counterbalance consists of a weight 32, having a screw-threaded shank 33, engaging in a longitudinal hole formed in an extension 34 of the crank, the said extension 34 being at the opposite side of the power-shaft from that on which the crank proper is arranged.

Pivoted to the frame of the motor 31 is a stop-arm 35. This stop-arm is designed to be moved into engagement with a pin 36, extending outward from the motor-frame and serving as a stop for the movements of the crank. The said arm 35 has an outwardly-extended finger 37, with which a portion of said crank will engage, and from this finger 37 a spring 38 extends to a connection with the base of the motor or with the base 1. The motor consists of a suitable train of gear-wheels operated by two springs 39 and 40, as plainly indicated in Fig. 2.

I will now describe the valve for governing the inlet and outlet of the pump-cylinders. The valve is plainly shown in the enlarged view, Fig. 3. It consists of a substantially L-shaped casing 41, having a communication 42 with the interior of the pump-cylinder. The vertical portion of the casing 41 is provided with an interior annular flange 43, which forms a rest for a valve-seat 44, which preferably consists of a perforated brass plate. Between the valve-seat 44 and the flange 43 may be arranged a suitable packing, as indicated in the drawings, and the valve-seat is forced tightly against said packing by means of a sleeve 45, arranged within the casing 41 and having an outwardly-extended annular flange 46, provided with a series of perforations through which clamping-bolts may pass, the said clamping-bolts also passing through perforations in an outwardly-extended flange on the upper end of the vertical portion of the casing 41. It will be seen that there is a slight space between the flange on the top of the casing and the flange 46. This space will allow for the adjustment of the sleeve relatively to the casing—that is, when it is desired to tighten the parts or the packing below the valve-seat, by tightening the nuts on the bolts the sleeve may be moved downward.

Connected to the upper side of the valve-seat 44 is a valve, here shown in the form of a flap-valve 47, designed, of course, to open upward. The horizontal portion of the casing 41 is provided with an interior annular flange 48 for supporting a valve-seat 49 similar to the valve-seat 44, a packing, of course, being arranged between the valve-seat and the flange. A sleeve 50, arranged within the horizontal portion of the casing, is designed to hold the valve-seat in engagement with the flange 48 in the manner described in connection with the sleeve 45. An inlet-valve 51 is secured to the inner side of the valve-seat 49, this inlet-valve 51 being in the form of a flap-valve.

The upper or outlet portions of the valve-casings for the pumps 17 and 18 are connected by a pipe 52, and this pipe 52 communicates with a pipe 53, leading into the air-pressure cylinder 11. A nipple 54 communicates with the interior of the cylinder 11, and to this nipple 54 a pipe may be connected to lead air under pressure to mix in a burner with gas generated in the machine. This extra amount of air will cause an intense heat or flame, by means of which brazing or similar operations may be performed.

In operation the alternately-operating pumps 17 and 18 will force air into the air-pressure cylinder 11, and the air will be forced from said cylinder through the generator 2 and the gas formed therein will be forced out through the service-pipes. In this machine the motor will be automatically stopped or retarded when the air-pressure in the cylinder 11 is greater than the power of the motor. Therefore there is no danger of bursting the elastic top 16 of the air-pressure cylinder.

Having thus described my invention, I claim as new and desire to secure by Letters Patent—

A gas-generating machine, comprising a generator, an air-pressure cylinder, a pump for forcing air into said cylinder, air inlet and outlet controlling devices for said pump, comprising a valve-casing having a vertical member and a substantially horizontal member, the said casing communicating with the interior of the pump, an annular flange formed within the vertical member of the casing and also in the horizontal member of the casing, valve-seats resting on said flanges, valves engaging the said seats, sleeves movable within the casing to engage the valve-seats, the said sleeves having at their outer ends outwardly-extended annular perforated flanges, and clamping-bolts passing through said perforations and through perforations in the flanges at the ends of the valve-casing, substantially as specified.

FRANK A. HUTTER.

Witnesses:
WALTER POND,
ABRAM C. BERNSTEIN.